United States Patent
Roberts et al.

(10) Patent No.: US 6,290,228 B1
(45) Date of Patent: Sep. 18, 2001

(54) LEG EXTENSIONS FOR A LAP-MOUNTED COMPUTER GAME ACCESSORY

(75) Inventors: Thomas John Roberts, Alpine; Kelly D. Tyler, Jamul, both of CA (US)

(73) Assignee: Mad Catz, Inc., Santee, CA (US)

( * ) Notice: Subject to any disclaimer, the term of this patent is extended or adjusted under 35 U.S.C. 154(b) by 0 days.

(21) Appl. No.: 09/309,754

(22) Filed: May 11, 1999

(51) Int. Cl.$^7$ ............................................ A63B 9/22
(52) U.S. Cl. ...................... 273/148 B; 463/46; 463/47
(58) Field of Search .................... 273/148 B; 463/46, 463/47; 108/43, 50.11, 144.11, 147.2, 147.22; 248/444, 918, 432; 345/156, 157; D6/406, 467

(56) References Cited

U.S. PATENT DOCUMENTS

| | | |
|---|---|---|
| 527,108 * | 10/1894 | Cooper ............................ 108/43 X |
| 2,039,922 | 5/1936 | Neats et al. . |
| 2,663,603 | 12/1953 | Newman . |
| 2,692,174 * | 10/1954 | Whitehead ...................... 108/43 X |
| 2,697,018 | 12/1954 | Georgides . |
| 2,750,705 * | 6/1956 | Keveney ......................... 108/43 X |
| 2,770,514 | 11/1956 | Idso . |
| 2,783,109 * | 2/1957 | Frey ................................ 108/43 |
| 2,844,429 | 7/1958 | Frey . |
| 2,979,990 | 4/1961 | Alexander . |
| 3,123,935 | 3/1964 | Williams . |
| 4,010,696 | 3/1977 | Preisman . |
| 4,311,099 | 1/1982 | Roberts . |
| 4,312,507 * | 1/1982 | Smith et al. ............... 273/148 B X |
| 4,422,640 | 12/1983 | Tamarkin . |
| 4,494,754 | 1/1985 | Wagner, Jr. . |
| 4,494,755 | 1/1985 | Caillouet, Jr. . |
| 4,504,059 | 3/1985 | Weinrieb . |
| 4,630,823 | 12/1986 | Grant . |
| 4,976,204 | 12/1990 | Konkle . |
| 5,038,688 | 8/1991 | Permenter . |
| 5,207,791 | 5/1993 | Scherbarth . |
| 5,520,119 * | 5/1996 | Eisenberg ............................ 108/43 |
| 5,829,745 | 11/1998 | Houle . |
| 5,937,765 * | 8/1999 | Stirling .............................. 108/43 |

OTHER PUBLICATIONS

Official Steering Wheel Ad, Offcial United Kingdom Playstation Magazine, p. 87, admitted prior art.
Dual Force Racing Wheel by Mad Catz, Visual Stimulation Reviews The Magazine for Technosapiens, p. 50, Mar./Apr. 1999 Issue.
Dual Force Racing Wheel by Mad Catz ad, 1988.
Mad Catz Analog Sterring Wheel, Review, p. 145, Dec. 1998.
Dual Force Racing Wheel by Mad Catz, admitted prior art.

* cited by examiner

Primary Examiner—Raleigh W. Chiu
(74) Attorney, Agent, or Firm—Luce, Forward, Hamilton & Scripps LLP

(57) ABSTRACT

An accessory for a computer game can be placed on a table top or in a person's lap. The accessory has a pair of extensions which can be moved between retracted and exposed positions. In the retracted position, the extensions serve as legs which support the accessory on a table top. In their exposed position, the extensions extend from a bottom or side edge of the accessory and wrap partially around the player's lap, enhancing the stability of the accessory. The accessory can also include a contoured underside having concavities sized and spaced to fit against the lap of the game player.

35 Claims, 4 Drawing Sheets

LEG EXTENSIONS FOR A LAP-MOUNTED COMPUTER GAME ACCESSORY

The present invention is directed to a computer game accessory or other device that rests on a person's lap, and more particularly to leg extensions for stabilizing such a device.

BACKGROUND OF THE INVENTION

Computer games are often accessorized with input devices, such as a joystick, that a player can hold in his or her hand. As games are getting more advanced, however, different types of input devices are being created.

BRIEF SUMMARY OF THE INVENTION

It is an object of the present invention to provide an electronic game accessory which is securely held on a player's lap.

Another object of the present invention is to provide a pair of retractable leg extensions that help secure a lap-mounted device on a person's lap.

It is yet another object of the present invention to provide retractable legs that help support a portable device on a table top or other smooth surface, and can also stabilize the device on a person's lap.

These and other objects are achieved by providing an article of manufacture, comprising a housing to be placed on a person's lap; and at least a first leg extension operatively connected to said housing, said first leg extension being movable between first and second positions and contacting more of an outer side of the lap when in the second position than when the first position.

These and other objects are also achieved by providing an accessory for an electronic game, comprising a portable housing to be placed on a person's lap; first and second leg extensions operatively connected to said housing, each leg extension being movable from a first position to an exposed position, the exposed position being such that said leg extensions extend generally downward from said housing and press against the sides of the person's lap, said first leg extension bracing against the left side of the person's left thigh and said second leg extension bracing against the right side of the person's right thigh.

The present invention provides retractable extensions on the underside of a lap-mounted device. The extensions support the device against the outer side of a person's thighs.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings.

DETAILED DESCRIPTION OF THE PREFERRED EMBODIMENTS

Although the following description of the preferred embodiments refers to an accessory for a computer game, it should be understood that the accessory can be any remote input and/or output apparatus connected through wired or wireless connection(s) to an electronic device, such as a computer game, or the accessory can be a self-contained electronic device or game. The computer games contemplated by the present invention include games played on personal computers, electronic games played on televisions or other monitors through dedicated game systems such as Nintendo64 or Sony PlayStation, as well as stand alone self-contained games.

Figure 1:
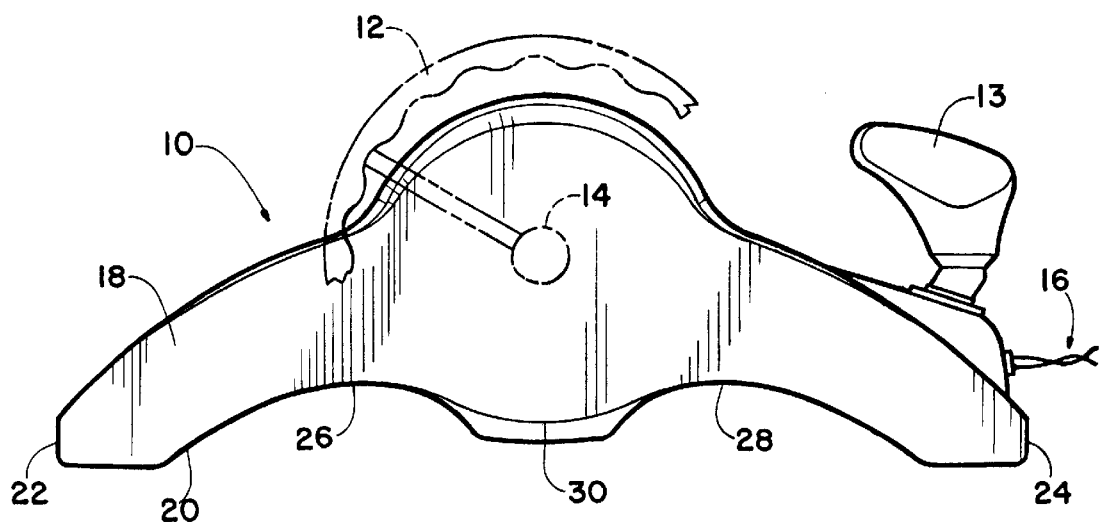
FIG. 1 shows a front view of a computer game accessory according to a preferred embodiment of the present invention.

FIG. 1 shows a computer game accessory according to a preferred embodiment of the present invention. In this embodiment, the accessory is an input apparatus having, as input devices, a gear shifter 13 and a steering wheel 12. The steering wheel is connected to a rotatable shaft 14. The accessory 10 is used by the player of the computer game to input signals in order to play the computer game. A wired or wireless communication line 16 transmits signals and/or power to and/or from the accessory 10 to a remote unit (not shown) which can be a personal computer, a dedicated game device, or any other remote terminal used to receive and/or transmit signals to/from the accessory 10. The communication line 16 is known in the art and need not be further elaborated herein, except to note that it is an optional feature and can be omitted if the accessory 10 is a self-contained game.

The artisan will recognize that the present invention finds applicability to accessories having input devices other than a steering wheel 12 and gear shifter 13, such as joysticks. Output components such as sound generators and/or visual indicators (not shown) can also be used with or without the input components.

The present invention allows the player to use the accessory comfortably from a sitting position. The accessory 10 is preferably light enough to rest comfortably on the player's lap, and has an outer body 18 made of plastic or other rigid material housing the accessory's internal electronic circuitry. The body 18 is preferably formed from at least two pieces which are attached during the accessory's latter stages of manufacture.

The body 18 includes an underside surface 20 having a width spanning between left and right edges 22 and 24, as viewed from the player's perspective. The left and right edges 22, 24 are spaced so as to span a person's lap. For adults, the width may be on the order of 45 cm (18 inches) or more in order to accommodate a lazy sitting position in which the knees are far apart, although the present invention is not limited to any particular width. For accessories designed specifically for children, the width is preferably smaller. In the preferred embodiment, the accessory 10 is on the order of 22 cm deep and 17.5 cm high, disregarding the steering wheel, but the invention is not limited to any particular dimension.

The underside surface 20 preferably includes at least one concavity designed to fit over the lap of the player while he or she is sitting. Two concavities 26, 28 are shown in FIG. 1, wherein a ridge 30 is formed at the intersection of the two concavities 26, 28 and lies, in use, between the thighs of the player. It should be understood, however, that the present invention can also be adapted to a body 18 having a single concavity for the entire lap, or a flat underside surface with no concavity at all.

Figure 2:
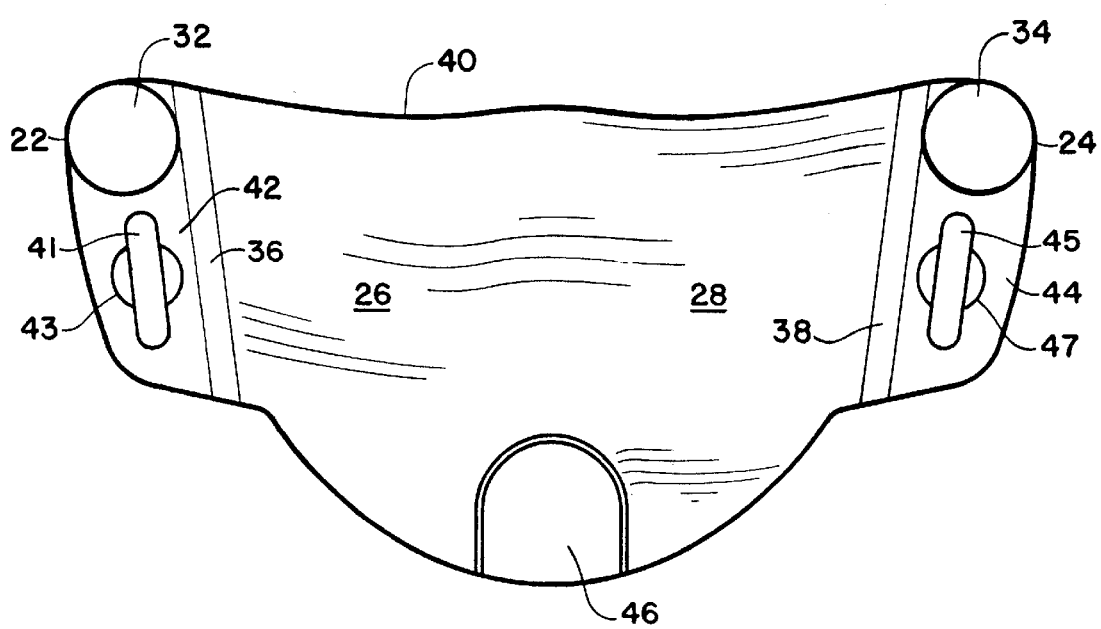
FIG. 2 shows a bottom view of the embodiment shown in FIG. 1.

FIG. 2 shows a bottom view of the embodiment of FIG. 1. The steering wheel 12 (not shown) extends from front surface 40. It is preferable for the underside surface 20 to have generally horizontal regions 42, 44 adjacent the left and right edges 22, 24 at or beyond the side edges of the player's lap. On those horizontal regions 42, 44 are two optional suction cups 32, 34 that can be used to secure the accessory 10 to a table top or other smooth surface while the player plays the game, as an alternative to resting it on the player's lap. Rubber or felt pads on the horizontal regions 42, 44 can be substituted for (or supplement) the suction cups 32, 34. By giving the two horizontal regions 42, 44 a length along the length of the body 18, they provide a stable surface for supporting the accessory 10 on a table top. At the back end of the accessory 10, a third generally horizontal region 46 is also preferably formed (or attached) on the body 18 so that the accessory 10 has three coplanar surfaces to support it when placed on a table top. A rubber or felt pad, or a suction cup (not shown) can also be used on the third horizontal region 46.

FIG. 2 also shows a pair of extensions 41, 45 forming part of the present invention. The extensions 41, 45 are essentially mirror-images of one another. Although the extensions are shown at the horizontal regions 42, 44 of body 18, the horizontal regions are not necessary in order to implement the present invention. The extensions can obviate the need for the horizontal regions to hold the accessory 10 stably on a flat surface, as explained below. One alternative is to have one or both of the extensions extend from a side surface of the body 18 rather than from the bottom.

Figure 4A:
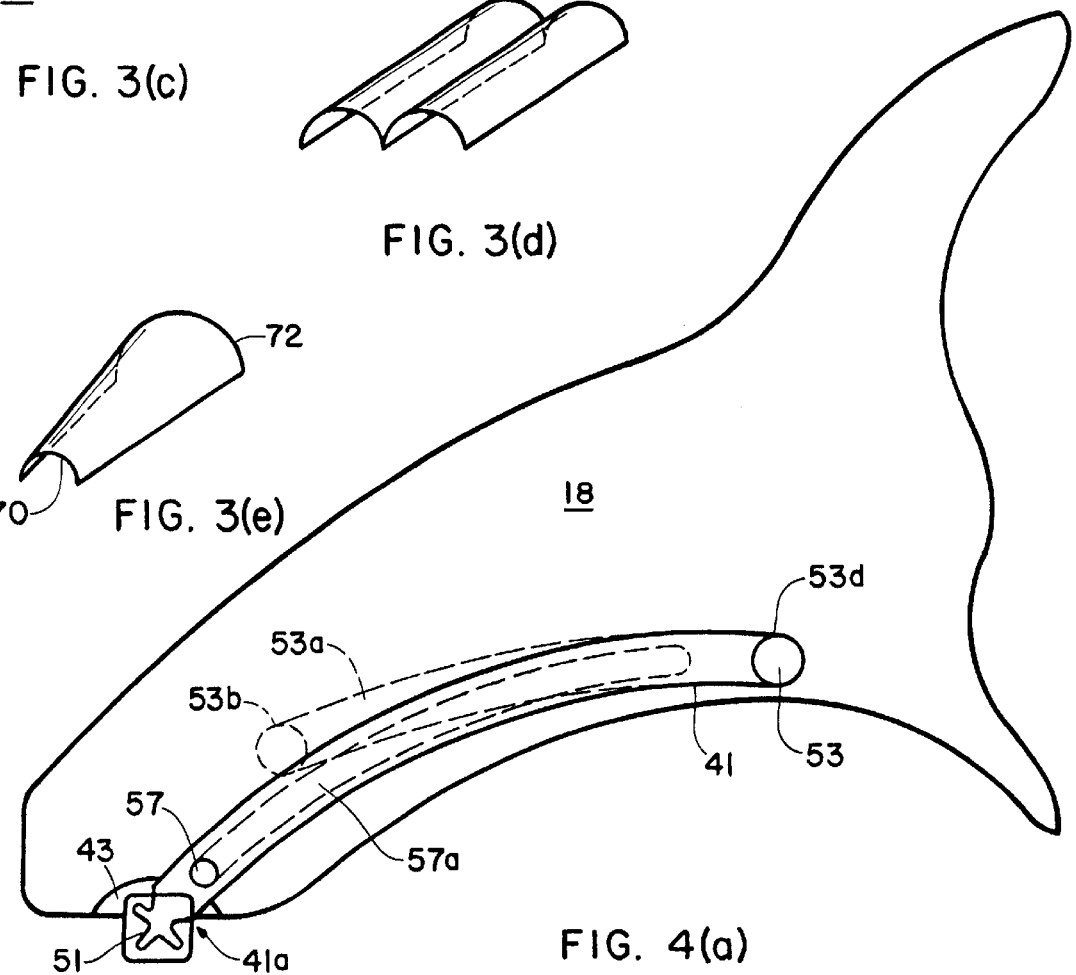
FIG. 4(a) shows a retractable leg extension in its retracted position, along lines IV—IV of FIG. 5.
Figure 4B:
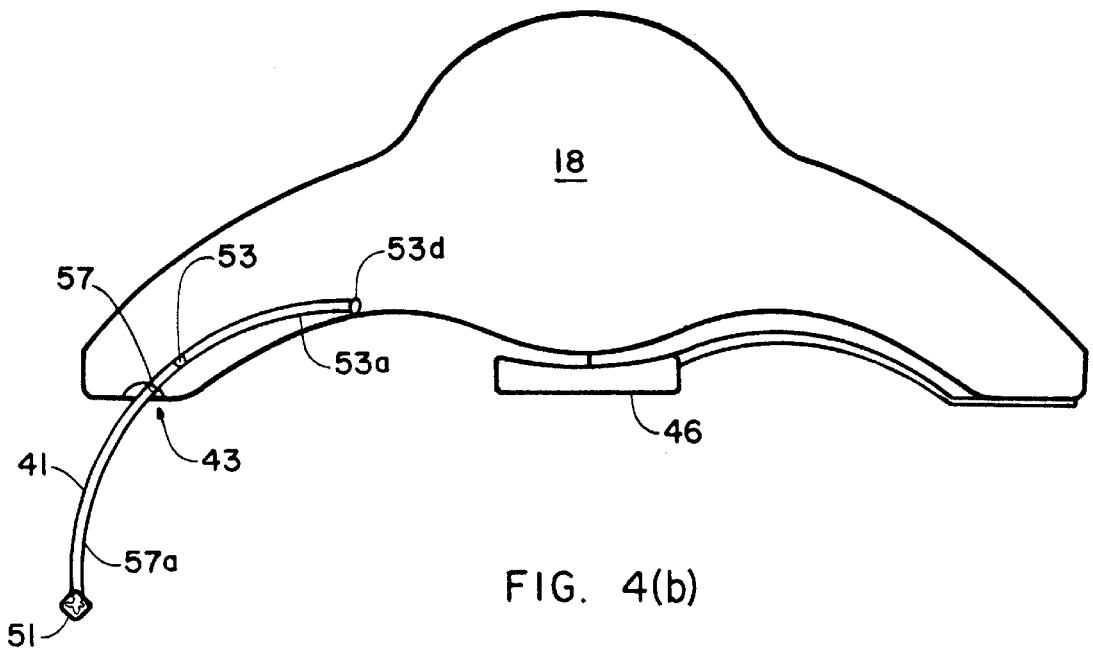
FIG. 4(b) shows the retractable leg extension of FIG. 4(a) in its exposed position.

Each extension 41, 45 is preferably shaped as a curved parallelogram and can be moved manually between retracted and exposed positions, as shown in FIGS. 4(a) and 4(b) respectively. Preferably, the path that each leg extension takes when being moved from one position to another is defined by the shape of the extension itself. One or more through-holes (not shown) can be provided in one or both extensions in order to reduce the amount of material used and/or to provide finger holes for moving the extensions. In a preferred embodiment, the retracted position of the extension 41 still exposes the bottom portion 41a of the extension below the bottom of the underside 20 and therefore will, to some extent, help stabilize the accessory on a person's lap. See FIG. 4(a). The exposed portion 41a, and a similar one for extension 43, can be used to support the accessory 10 on a table top or other smooth surface and therefore obviate the need for horizontal surfaces 42, 44. A rubber pad 51 or other friction material can be integrated into, or secured on, the bottom portions of extensions 41, 43 to prevent the accessory 10 from sliding on the table during use. In such an embodiment, the optional suction cups 32, 34 are preferably excluded. In an alternative embodiment, the extensions 41, 45 can be made to retract more fully so that they do not contact the table top.

Figure 5:
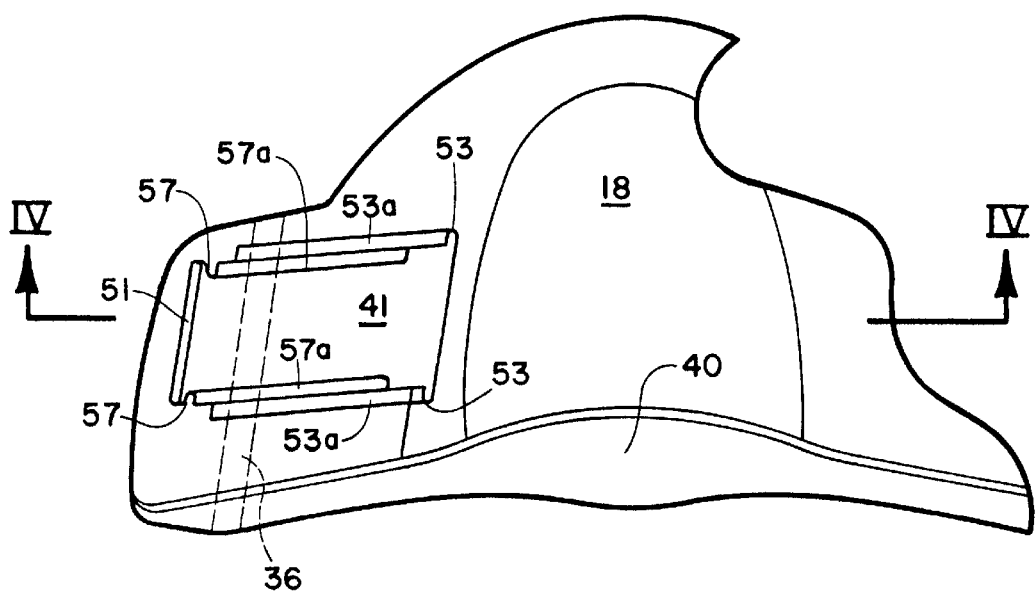
FIG. 5 shows a partial top view of a leg extension according to a preferred embodiment of the present invention.

FIG. 4(b) shows the extension 41 in its exposed position. The extension is preferably formed of a rigid or semi-rigid material, such as metal or plastic, and has an arcuate shape designed to fit snugly against a person's thigh. As shown in FIG. 5, the extension is preferably shaped as a curved parallelogram, although it can be a rectangle or other appropriate shape. The curved profile preferably complements the arcuate cross section of the concavity or concavities 26, 28. Each extension also has a width dimension running along the length of the person's lap, as shown in FIGS. 2 and 5. As considered along the width dimension, the extensions 41, 45 are preferably straight.

According to a preferred embodiment of the present invention, each extension retracts into a hollow portion of the body 18. Alternatively, it can be made to retract along the top or underside of the body and thus be continually exposed. On the top corner of the front and back side edges of each extension is a peg 53 which slides in a corresponding groove 53a shown in phantom in FIG. 4(a). The groove 53a is generally arcuate and is wide enough for peg 53 to slide freely between the end positions of the groove. Detents near the ends 53b, 53d of the groove 53a allow the peg 53 to "click" into place at the end positions. Pegs 53 can be replaced by flexible detents or similar mechanisms which allow the extensions to be positioned at discrete locations along the groove 53a. Although the preferred embodiment contemplates only two positions for each extension, one at each of the respective ends of the groove 53a, the artisan will appreciate that additional intermediate positions can also be provided.

As an alternative to the peg or detent embodiment, the present invention can also use a friction-fit between the groove and the side edge of the extension 41, 45 such that the extension can be moved to any desired position between the end points of the groove. An extension can also be locked into place using a threaded screw which passes through a portion of the body 18 and presses against the broad side of the extension.

In addition to the pegs 53, the preferred embodiment also provides each extension with its own pair of grooves 57a which mate with corresponding pegs 57 on the body 18. The grooves 57a run along the front and back side edges of the extension, stopping just short of the pegs 53. The pegs 57 are preferably located where the extensions exit the body 18. As with the pegs 53, the artisan will appreciate that detents or other mechanisms can be substituted for the pegs 57. The pegs 57 can also be made to "click" into proper positions in their grooves.

For each extension, the spacing between the peg 57 and the end 53b of groove 53a is preferably a few centimeters as shown in FIG. 4(a) so that the extension can press with significant force against the outer side of the person's thigh.

The extensions 41, 45 pass through respective holes in the body 18 near finger access depressions (or holes) 43, 47. In operation, the player uses the accesses 43, 47 (FIG. 2) to grip the bottom edges of the extensions 41, 45 and manually move them from the retracted position to the exposed position. Because of the shape and direction of groove 53a, and the location of the peg 57 relative to the end position 53d of groove 53a, the exposed position places the extensions in a more vertical orientation as compared to the retracted position. The exposed position for extension 41 is shown in FIG. 4(b), and demonstrates how the contour of the concavity or concavities 26, 28 is complemented by the arcuate shape of the extensions to wrap partially around the outside of the player's thighs.

As seen in FIG. 2, the concavities 26, 28 have outer sides 36, 38 where they transition into the horizontal regions 42, 44 near edges 22, 24. These outer sides 36, 38 together with the shape of the ridge 30 (if present) define the shape of the concavities. The shapes of the concavities, which are preferably arcuate and symmetrical in cross section but need not be, not only provide a comfortable surface for resting the accessory against the player's lap, but together with the extensions 41, 45 also can assist the player in playing the game. For example, when steering wheel 12 is used as the input component, a spring device (not shown) can be used to urge the wheel toward its neutral position. By turning the wheel to the left or right, the spring creates a torque that urges the body of the accessory 10 to rotate along with the wheel, but the player's thighs prevent such rotation. By forming the concavity(ies) and extensions 41, 45 such that they engage the outer sides of the player's thighs, especially in the lap area closer to the knee, the user can have better control over his or her steering of the game. Other input components, such as joysticks, may influence the use of different shapes for the concavity(ies) and extensions.

In a preferred embodiment, the concavity is recessed about 4 cm (1.5 inches) from the elevation of the horizontal regions 42, 44, the ridge 30 (if present) is also recessed relative to the horizontal regions 42, 44, and makes each concavity about 20 cm (8 inches) in width, or a single concavity may be about 40 cm (16 inches) wide. The extensions 41, 45 preferably extend about 10 cm (4 inches) or so from the bottom of the body 18 when in the exposed position.

In FIG. 2, the shape of the concavities is such that the outer sides 36, 38 are spaced farther apart near the front surface 40 than at the back end of the accessory, making the central axes of the concavities converge as considered in a direction away from the player's torso. Likewise, the extensions 41, 45 also converge as considered in the same direction. In FIG. 2, the size of the ridge is generally constant between the front surface 40 and the back end of the accessory.

FIGS. 3(a) to 3(g) show geometric cross sections exemplifying alternative shapes contemplated for the concavities of the present invention. If only one concavity is used (see FIG. 4(c)), then the outside surfaces 36, 38 of the concavity are the critical surfaces to consider with regard to whether they converge, diverge, or remain parallel. For a single concavity, the surfaces 36, 38 can take on one or more of the shapes shown in FIGS. 3(a) to 3(g). Because it is preferable for the extensions 41, 45 to be parallel to the outside surfaces 36, 38, the extensions likewise can converge, diverge, or be parallel to one another.

Figure 3A:
FIGS. 3(a) to 3(g) show alternative shapes to the concavities according to various embodiments of the present invention.
Figure 4C:
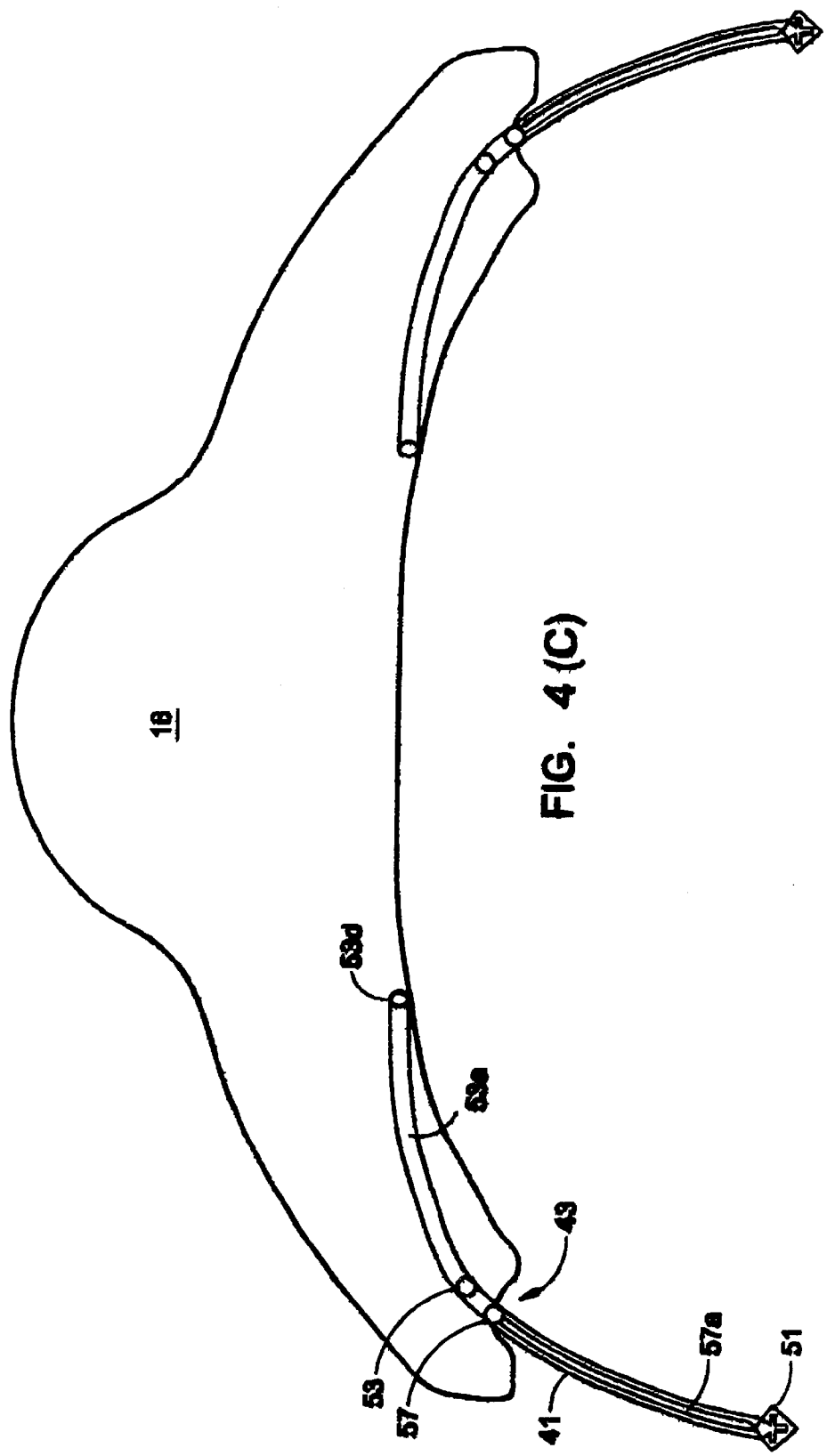
FIG. 4(c) shows, in cross-section, an embodiment of the present invention contacting both sides of a single thigh.

FIG. 3(a) shows an embodiment in which the concavity, or both of them, is continuous, meaning that it is designed to contact the player's thigh throughout the length of the concavity. The arcuate cross sectional shape of the concavity may be different at various locations along the length of the concavity, but contact with the thigh is expected.

Figure 3F:
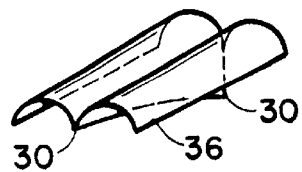
Figure 3B:
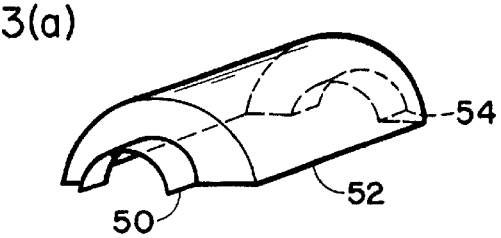

FIG. 3(b) shows an alternative in which the concavity, or both of them, has a front concave region 50 disposed near the front surface 34 and having an arcuate cross section, and a back concave region 54 disposed near the back end of the accessory 10 and having another arcuate cross section. Between the front and back regions 50, 54 is a further depressed region 52 at a different height relative to the front and back regions 50, 54 such that the depressed region 52 does not contact the thighs of the player. The arcuate cross sections of the front and back concave regions 50, 54 can be identical or different, and the depressed region 52 can be arcuate in cross section but need not be. Preferably, the embodiment of FIG. 3(b) has a smooth transition from the front concave region 50 to the depressed region 52 and back to the back concave region 54. This embodiment is especially useful when the extensions 41, 45 are designed to retract underneath the body 18 rather than inside it.

Figure 3G:
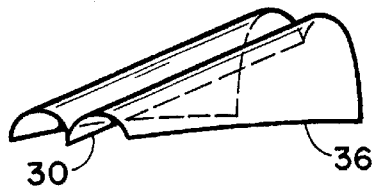
Figure 3C:
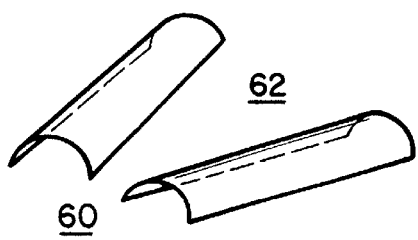

FIG. 3(c) shows embodiments in which the concavities diverge or converge, depending on whether the front surface 34 of the accessory 10 is where the concavities are close together, as at reference 60 in the figure, or far apart as at reference 62. In either of these embodiments, the ridge 30 between the concavities can have a constant size throughout the length of the concavities, or it can increase (or decrease) in width as the concavities diverge (converge).

Figure 3D:
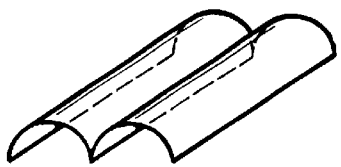

FIG. 3(d) shows an alternative in which the concavities are parallel to one another. The arcuate cross section of each concavity need not be identical throughout its length. Rather, the parallel shape is based on the directions of the main axes of the concavities as considered along their length.

Figure 3E:
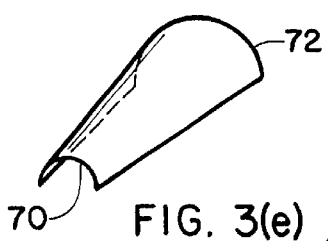

FIG. 3(e) shows embodiments in which the concavities themselves increase or decrease in cross sectional shape, depending on whether the front surface 34 of the accessory 10 is where the arcuate cross section is smaller, as at reference 70 in the figure, or larger as at reference 72.

FIG. 3(f) shows an embodiment in which the height of the ridge 30 increases or decreases along the length of the concavities, depending on whether the front surface 34 of the accessory 10 is where the ridge 30 is at an equal or higher elevation than the height of the outer sides 36, 38, as also shown in FIG. 1, or where the ridge 30 is at a lower elevation. In this embodiment elevation is relative, meaning that the outer sides 36, 38 may rise along their length as the ridge's elevation in the player's lap stays constant, or the outer sides may remain constant as the ridge 30 increases (decreases) in height.

FIG. 3(g) shows an embodiment similar to that of FIG. 3(f), but where the outer sides 36, 38 increase or decrease in height along their lengths. In FIG. 3(g), the elevation of the ridge 30 remains generally equal to or higher in elevation than the outer sides 36, 38.

The artisan will appreciate that the embodiments of FIGS. 3(a) through 3(g) can be mixed and matched as necessary.

The invention having been thus described, it will be obvious that the same may be varied in many ways, not only in construction but also in application. For example, the extensions and/or the contoured underside of the accessory can be textured or covered with a friction material such as rubber in order to enhance the stability of the accessory against the player's lap. The contour and/or extensions can also be formed from a padded material such as foam or rubber. The size of the accessory can be reduced such that it fits over one thigh 101 rather than the entire lap (see FIG. 4(c)). The ridge 30 can be configured to contain two additional leg extensions so that there are a total of four extensions, two for each thigh. Such variations are not to be regarded as a departure from the spirit and scope of the invention, but rather as modifications intended to be encompassed within the scope of the following claims.

What is claimed is:

1. An article of manufacture, comprising:
   a housing to be placed on a person's lap; and
   at least a first leg extension operatively connected to said housing, said first leg extension being movable between at least first and second positions and contacting more of an outer side of the lap when in the second position than when in the first position;

wherein a top edge of said first leg extension moves through an elongated path as said first leg extension moves from the second position toward the first position; and wherein said article is an accessory for an electronic game and further comprises an input device on said housing, said input device being operable by the person to input commands to the electronic game.

2. The article of manufacture of claim 1, wherein said input device is a steering wheel.

3. The article of manufacture of claim 1, further comprising a second leg extension, said second leg extension being a mirror-image of said first leg extension.

4. The article of manufacture of claim 3, wherein said first and second leg extensions are adapted to contact opposite sides of a single thigh.

5. The article of manufacture of claim 1, wherein said housing further includes an underside surface adapted to contact the person's lap at least when said first leg extension is in the second position, said underside surface including at least one concavity sized to match a contour of the person's lap.

6. The article of manufacture of claim 1, wherein said article is a self-contained stand alone electronic game.

7. The article of manufacture of claim 6, further comprising an input device on said housing, said input device being operable by the person to input commands to the electronic game.

8. The article of manufacture of claim 1, wherein the path is defined by a groove in said housing.

9. The article of manufacture of claim 8, wherein the groove is arcuate and generally follows an arc of the lap.

10. The article of manufacture of claim 8, wherein a mating connection between said first leg extension and said groove includes a friction fit which permits said first leg extension to be held in place at positions between said exposed and retracted positions.

11. The article of manufacture of claim 8, wherein a mating connection between said first leg extension and said groove includes at least one detent which permits said first leg extension to be held in place at a discrete position.

12. The article of manufacture of claim 1, wherein, in the second position, said first leg extension extends generally downward from said housing, and further wherein the top edge is proximal to said housing in the second position.

13. The accessory of claim 1, wherein said first leg extension is generally parallelogram-shaped and curved to generally match a contour of the person's lap.

14. An accessory for an electronic game, comprising:

a portable housing to be placed on a person's lap;

first and second leg extensions operatively connected to said housing, each leg extension being movable from a first position to an exposed position, the exposed position being such that said leg extensions extend generally downward from said housing and are adapted to press against the sides of the person's lap, said first leg extension adapted to press against the left side of the person's left thigh and said second leg extension adapted to press against the right side of the person's right thigh, wherein said leg extensions and housing are operatively connected by a peg and groove arrangement, said peg and groove arrangement allowing said leg extensions to slide between said first and exposed positions.

15. The accessory of claim 14, wherein said leg extensions are parallelograms curved to generally match a contour of the person's lap.

16. The accessory of claim 14, wherein said housing further includes an underside surface having a single concavity sized to match a contour of the person's lap.

17. The accessory of claim 14, wherein said housing further includes an underside surface having two concavities, each of said concavities being sized to match a contour of a respective one of the person's thighs.

18. The accessory of claim 14, further comprising an input device on said housing, said input device being operable by the person to input commands to the electronic game.

19. The accessory of claim 14, wherein, as considered in a direction away from the person's torso, said first and second leg extensions converge toward one another in the exposed position.

20. The accessory of claim 14, wherein, as considered in a direction away from the person's torso, said first and second leg extensions diverge away from one another in the exposed position.

21. The accessory of claim 14, wherein, as considered in a direction away from the person's torso, said first and second leg extensions are parallel to one another in the exposed position.

22. An accessory for an electronic game, comprising:

a portable housing to be placed on a person's lap; and first and second leg extensions operatively connected to said housing, each leg extension being movable along a curvilineral path from a first position to an exposed position, the exposed position being such that said leg extensions extend generally downward from said housing and are adapted to press against the sides of the person's lap, said first leg extension adapted to press against the left side of the person's left thigh and said second leg extension adapted to press against the right side of the person's right thigh;

wherein said first position is a retracted position wherein said first and second leg extensions are within a hollow cavity in said housing.

23. An accessory for an electronic game, comprising:

a portable housing to be placed on a person's lap;

first and second leg extensions operatively connected to said housing, each leg extension being movable along a curvilinear path from a first position to an exposed position, the exposed position being such that said leg extensions extend generally downward from said housing and are adapted to press against the sides of the person's lap, said first leg extension adapted to press against the left side of the person's left thigh and said second leg extension adapted to press against the right side of the person's right thigh;

wherein said first position is a retracted position wherein only an end portion of said leg extensions extend downward from said housing, said portion being operable to support said accessory on a horizontal surface.

24. The accessory of claim 23, further comprising a friction surface on said end portion.

25. An accessory for an electronic game, comprising:

a portable housing;

a steering wheel input device on said portable housing operable by a person, for inputting commands to the electronic game;

a contoured surface on an underside of said portable housing; and left and right leg extensions operatively connected to said housing, each of said leg extensions being movable between retracted and exposed positions, said leg extensions extending generally downward from said housing when in the exposed position such that said leg extensions wrap partially around the respective thighs of the person's lap, and respective bottom ends of said leg extensions being adjacent a bottom surface of said housing when in the retracted position such that said leg extensions can support said housing on a horizontal surface.

26. The accessory of claim 25, wherein said housing further includes an underside surface having a single concavity sized to match a contour of the person's lap.

27. The accessory of claim 25, wherein said housing further includes an underside surface having two concavities, each of said concavities being sized to match a contour of a respective one of the person's thighs.

28. An article of manufacture, comprising:
   a housing to be placed on a person's lap; and
   at least a first leg extension operatively connected to said housing, said first leg extension being movable along a curvilinear path between a retracted position and an exposed position, the exposed position being such that said first leg extension extends generally downward from said housing and is adapted to press against a side of the person's lap,
   wherein, in the exposed position, said first leg extension has a top edge near said housing and a bottom edge distal from said housing, and, when in the retracted position, said bottom edge is further from a center of said housing than said top edge.

29. The article of manufacture of claim 28, wherein said article is a self-contained stand alone electronic device.

30. The article of manufacture of claim 29, further comprising an input device on said housing, said input device being operable by the person to input commands to the electronic device.

31. The article of manufacture of claim 29, wherein the top edge moves through an elongated path as said first leg extension moves from the exposed position toward the retracted position.

32. The article of manufacture of claim 28, further comprising a mating connection between said first leg extension and said housing, said mating connection including at least one discrete intermediate position to which said first leg extension may be moved between the retracted and exposed positions.

33. The article of manufacture of claim 28, further comprising a second leg extension, said second leg extension being a mirror-image of said first leg extension.

34. An article of manufacture, comprising:
   a housing to be placed on a person's lap; and
   at least a first leg extension operatively connected to said housing, said first leg extension being movable along a curvilinear path between at least first and second positions and contacting more of an outer side of the lap when in the second position than when in the first position,
   wherein a bottom edge of said first leg extension moves through an elongated path as said first leg extension moves from the exposed position toward the retracted position, the path being generally coextensive with a shape of said first leg extension.

35. The accessory of claim 34, wherein said first leg extension is generally parallelogram-shaped and curved to generally match a contour of the person's lap.

* * * * *